US008452030B2

(12) United States Patent
Kohara et al.

(10) Patent No.: US 8,452,030 B2
(45) Date of Patent: May 28, 2013

(54) EXTERNAL EQUIPMENT CONTROLLING APPARATUS

(75) Inventors: Osamu Kohara, Hamamatsu (JP); Hisanori Itoga, Hamamatsu (JP); Kazuhiko Honda, Hamamatsu (JP)

(73) Assignee: Yamaha Corporation, Hamamatsu-shi (JP)

( * ) Notice: Subject to any disclaimer, the term of this patent is extended or adjusted under 35 U.S.C. 154(b) by 309 days.

(21) Appl. No.: 12/845,187

(22) Filed: Jul. 28, 2010

(65) Prior Publication Data

US 2011/0025916 A1 Feb. 3, 2011

(30) Foreign Application Priority Data

Jul. 29, 2009 (JP) ................................ 2009-176186

(51) Int. Cl.
*H02B 1/00* (2006.01)

(52) U.S. Cl.
USPC .................. 381/123; 381/80; 381/81; 381/85

(58) Field of Classification Search
USPC ................. 381/123, 120, 110, 107, 105, 104, 381/80, 81, 28, 1, 2, 85, 13, 17, 18, 307, 381/309, 311, 55, 322, 329, 72, 74, 332, 381/334, 94.5, 94.6, 103, 366, 370, 124, 381/77; 386/96, 125, 46; 700/94, 96; 455/295
See application file for complete search history.

(56) References Cited

U.S. PATENT DOCUMENTS

2005/0141857 A1 * 6/2005 Shimozawa et al. ............ 386/46
2006/0093330 A1 * 5/2006 Shimozawa et al. ............ 386/96

FOREIGN PATENT DOCUMENTS

JP 2005242667 A * 9/2005
JP 2006-187027 A 7/2006
JP 2007265466 A * 10/2007

* cited by examiner

*Primary Examiner* — Vivian Chin
*Assistant Examiner* — Leshui Zhang
(74) *Attorney, Agent, or Firm* — Crowell & Moring LLP

(57) ABSTRACT

An external equipment controlling apparatus includes: a connecting unit, connected to an external equipment via an interface to input/receive data into/from the external equipment, the external equipment to which audio data is input and which performs an acoustic process to a sound corresponding to the audio data and causes a speaker to emit the sound; an audio data outputting unit, operable to generate the audio data, and operable to output the audio data to the external equipment; an identification information acquiring unit, configured to acquire identification information for specifying the external equipment from the external equipment; a program acquiring unit, configured to acquire a control program corresponding to the external equipment specified by the identification information from a server via a network; a video data outputting unit, operable to generate video data for displaying a setting screen for setting the acoustic process on a displaying unit, and operable to output the video data to the displaying unit; and a controlling unit, by executing the control program, configured to control a content of the video data and to control the external equipment by setting the acoustic process in response to command information to be input.

9 Claims, 10 Drawing Sheets

FIG. 2A

PROGRAM DB

| MODEL NAME | CONTROL PROGRAM |
|---|---|
| MODEL A | CONTROL PROGRAM A |
| MODEL B | CONTROL PROGRAM B |
| MODEL C | CONTROL PROGRAM C |
| ⋮ | ⋮ |

FIG. 2B

SETTING DB

| HALL NAME | BASIC DATA | SEAT PARAMETER |
|---|---|---|
| HALL A | BASIC DATA A | 1-A1 |
| | | 1-A2 |
| | | ⋮ |
| | | 2-D5 |
| | | 2-D6 |
| | | ⋮ |
| HALL B | BASIC DATA B | ⋮ |
| ⋮ | ⋮ | ⋮ |

*FIG. 9*

PROGRAM DB

| MODEL NAME | CONTROL PROGRAM | VERSION |
|---|---|---|
| MODEL A | CONTROL PROGRAM A | 1.2 |
| MODEL B | CONTROL PROGRAM B | 1.13 |
| MODEL C | CONTROL PROGRAM C | 2.1 |
| ⋮ | ⋮ | ⋮ |

EXTERNAL EQUIPMENT CONTROLLING APPARATUS

BACKGROUND OF THE INVENTION

The present invention relates to the art to perform control of connected external equipments.

Nowadays the user can enjoy various contents of high tone quality, by causing the speakers to emit the sounds by using the AV amplifier that is equipped with a function of performing various acoustic processes. Normally, the user sets which acoustic process should be performed, while looking at the display screen equipped with the AV amplifier. In a situation that the AV amplifier is connected to the display device such as the television set, the user can cause the display device to display a setting screen on the display screen by using an OSD (On Screen Display) display function, and then the user can set the acoustic process by operating a remote controller of the AV amplifier while looking at the display screen (see JP-A-2006-187027, for example).

The acoustic equipment such as the AV amplifier is fully equipped with a function of performing the acoustic process from the attribute of such equipment. Conversely, the acoustic equipment does not have a function of outputting the video as the principal purpose, and therefore is not substantial in a display function. Accordingly, even though OSD as a display function is provided for setting purpose, this display gives no more than a simple display. Therefore, even when the setting screen is displayed on the display screen of the display device, this display still gives merely the simple display. As a result, there are some cases where such display is inconvenient for complicated settings or such display makes it difficult for the user to see the set contents and the set method at a glance. On the contrary, in order to enrich the contents being displayed on the display screen, the function of outputting the video, which is not the important factor in using the acoustic equipment, must be filled out, and therefore a cost increase is caused.

SUMMARY

It is therefore an object of the apparatus to execute easily various settings of an acoustic equipment in the acoustic equipment such as an AV amplifier, while suppressing a cost increase.

In order to achieve the object, according to the invention, there is provided an external equipment controlling apparatus, comprising:

a connecting unit, connected to an external equipment via an interface to input/receive data into/from the external equipment, the external equipment to which audio data is input and which performs an acoustic process to a sound corresponding to the audio data and causes a speaker to emit the sound;

an audio data outputting unit, operable to generate the audio data, and operable to output the audio data to the external equipment;

an identification information acquiring unit, configured to acquire identification information for specifying the external equipment from the external equipment;

a program acquiring unit, configured to acquire a control program corresponding to the external equipment specified by the identification information from a server via a network;

a video data outputting unit, operable to generate video data for displaying a setting screen for setting the acoustic process on a displaying unit, and operable to output the video data to the displaying unit; and a controlling unit, by executing the control program, configured to control a content of the video data and to control the external equipment by setting the acoustic process in response to command information to be input.

The server may store a parameter which is used to perform the acoustic process and which corresponds to a content of the acoustic process. The controlling unit may acquire the parameter to set the acoustic process from the server and set the parameter in the external equipment.

The external equipment controlling apparatus may further include: a reading unit, operable to read information recorded on a recording medium. The audio data outputting unit may generate the audio data based on the information read by the reading unit. The video data outputting unit may generate the video data based on the information read by the reading unit. The controlling unit may change a content of the setting screen, which is displayed on the displaying unit, in response to the information read by the reading unit.

The server may store a plurality of control programs corresponding to a plurality of external equipments respectively. The connecting unit may be connected to the plurality of external equipments. The identification information acquiring unit may acquire the identification information for specifying one of the plurality of external equipments. The program acquiring unit may acquire one of the plurality of control programs which corresponds to the one of the plurality of external equipments.

According to the invention, there is also provided a method of setting an acoustic process of an external equipment to which audio data is input and which performs an acoustic process to a sound corresponding to the audio data and causes a speaker to emit the sound, the method comprising:

acquiring identification information for specifying the external equipment from the external equipment;

acquiring a control program corresponding to the external equipment specified by the identification information from a server via a network;

generating video data for displaying a setting screen for setting the acoustic process on a displaying unit and outputting the video data to the displaying unit; and by executing the control program, controlling a content of the video data and controlling the external equipment by setting the acoustic process in response to command information to be input.

BRIEF DESCRIPTION OF THE DRAWINGS

FIGS. 2A and 2B are views explaining databases stored in a server.

FIG. 9 is a view explaining a database stored in the server according to Variation 1.

DETAILED DESCRIPTION OF EMBODIMENTS

Embodiment

[Overall Configuration]

Figure 1:
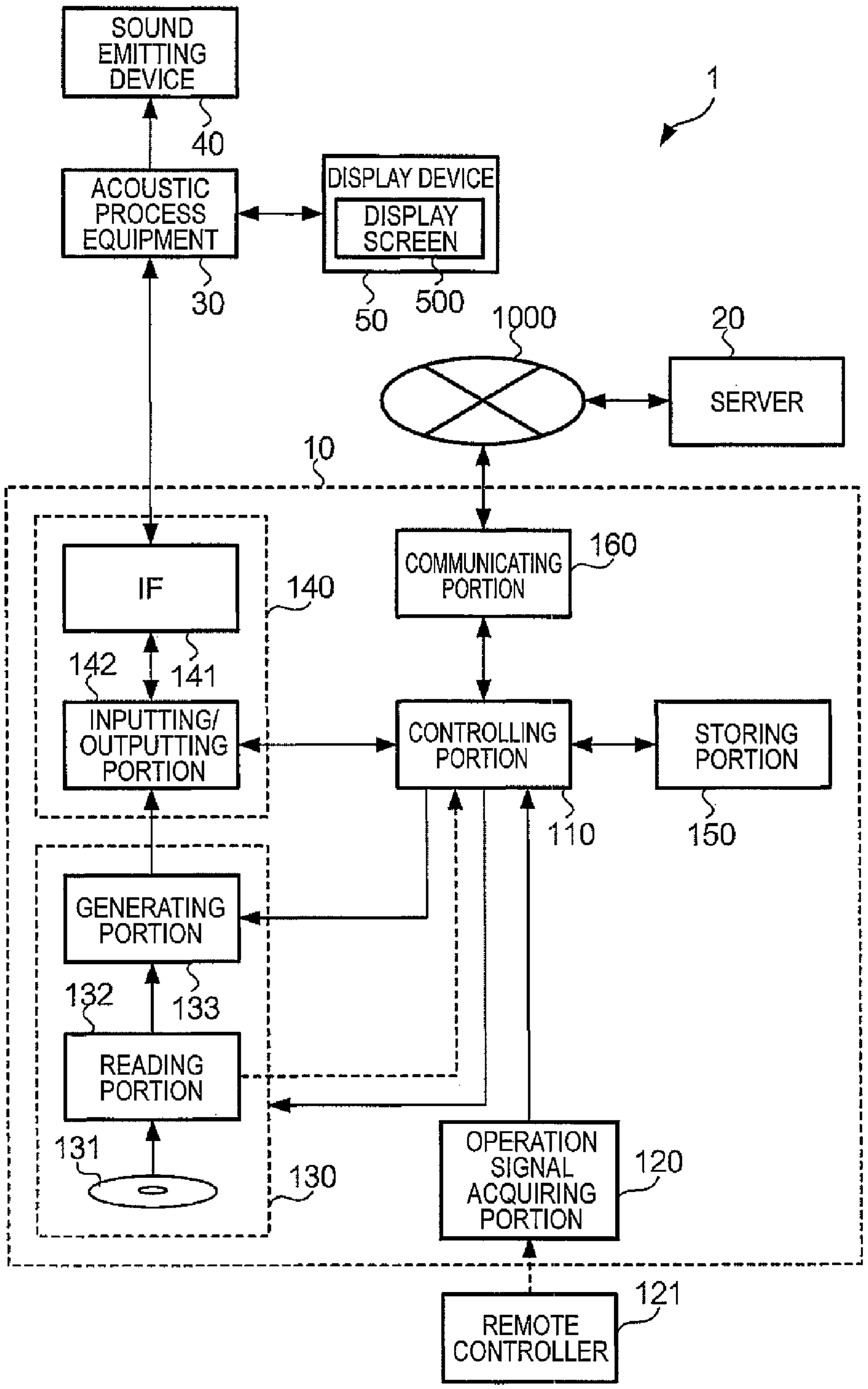
FIG. 1 is a block diagram showing a configuration of an AV system according to an embodiment of the present invention.

FIG. 1 is a block diagram showing a configuration of an AV system 1 according to an embodiment of the present invention. As shown in FIG. 1, the AV system 1 includes a reproducing equipment 10 as an example of the external equipment controlling apparatus of the present invention, a server 20 connected to this reproducing equipment 10 via a network 1000 such as the Internet, or the like, an acoustic process equipment 30 such as an AV amplifier, or the like, a sound emitting device 40 such as a speaker, or the like, for emitting the sound in response to the input audio signal, and a display device 50 with a display screen 500 such as a television device or the like, for providing various displays.

The reproducing equipment 10 and the acoustic process equipment 30 and also the acoustic process equipment 30 and the display device 50 are connected mutually by using HDMI (High-Definition Multimedia Interface) (registered trademark), for example, such that various controls under CEC (Consumer Electronics Control), the inputting/outputting of various data, and the like can be executed. Here, the reproducing equipment 10 and the display device 50 are connected indirectly via the acoustic process equipment 30. In this case, video data being output from the reproducing equipment 10 as described later are output to the display device 50 to pass through the acoustic process equipment 30.

Here, the connection between the reproducing equipment 10 and the display device 50 is not limited to the indirect connection, and the direct connection may be applied. Also, the connection not using the HDMI may be employed if such connection can input/output video data, audio data, control signals used to perform various controls, etc. Also, these connections may be provided via cable or radio.

The acoustic process equipment 30 acquires the audio data being output from the reproducing equipment 10 as described later, and then performs various acoustic processes, e.g., applies the sound field effect, and the like. Then, the acoustic process equipment 30 outputs audio signals, which are obtained by performing the digital-analog conversion to the audio data that has been subjected to the acoustic process, to the sound emitting device 40. As to the contents of this acoustic process, the acoustic process is set by the setting process, which is performed in the reproducing equipment 10 as described later, in response to the control signal being output from the reproducing equipment 10. Also, the acoustic process equipment 30 outputs identification information indicating the model of own equipment to the reproducing equipment 10 in response to the request from the reproducing equipment 10.

The display device 50 acquires video data being output from the reproducing equipment 10 as described later, and then makes a display on the display screen 500 in response to the video data.

[Configuration of the Server 20]

The server 20 stores a program DB (database), in which a control program to be executed in the reproducing equipment 10 is registered, and a setting DB (database), in which respective data, parameters, etc. used in executing the control program are stored, in storing means such as a hard disc, or the like. The program DB and the setting DB will be explained by using FIGS. 2A and 2B hereunder.

FIGS. 2A and 2B are views explaining databases stored in the server 20. FIG. 2A shows the program DB in which the control programs are registered in accordance with the models of the acoustic process equipment 30. For example, control programs A, B, C are registered in the program DB to correspond to models A, B, C respectively. Here, the "model" denotes the type of the acoustic process equipment 30, which is specified by identification information such as the model number, or the like. In this example, the control programs corresponding to the acoustic process equipments 30 are registered, but the control program corresponding to the display device 50, and the like may be registered.

The "control program" denotes the program that implements not only a function of generating the video data, which are used to display the setting screen used when the setting of the acoustic process in the acoustic process equipment 30 is carried out on the display screen 500, but also a function of generating the control signal, which is used to set the acoustic process in the acoustic process equipment 30, when this control program is executed in the reproducing equipment 10. Since either the settable contents or the contents of the acceptable control signals are different every model of the acoustic process equipment 30, the control programs are registered in response to respective models. In this example, the control programs associated with the acoustic process are explained by way of example, but the control programs corresponding to various settings may also be registered.

FIG. 2B shows an example of the setting DB. In this example, the data used when, out of the settings of the acoustic processes that are implemented by the control program, the setting for applying the sound field effect to the sounds corresponding to the audio data is carried out are registered. In this setting DB, the data used to apply the sound field effect, corresponding to various halls are registered. Basic data containing information about the basic display contents of acoustic characteristics, seat arrangement, and setting screen of the hall, and seat parameters indicating parameters used to reproduce the sound field in respective seats in the hall are registered in accordance with respective halls. For example, basic data A are registered to correspond to a hall A, and seat parameters (1-A1, 1-A2, . . . ) are registered. The seat parameter (2-D5) denotes the parameter that applies the sound field effect to reproduce the sound field when the user listens the performance on the stage in the D5 seat on the second floor.

In this event, when the basic data and the parameters that are different every model are needed, these data and these parameters may be registered every model. Alternately, the same basic data and the same parameter may be registered for all models, and then may be converted by executing the control program to correspond to each model.

The server 20 is connected to the reproducing equipment 10 via the network 1000, as described above, and transmits the control program, the basic data, and the seat parameter in response to the request from the reproducing equipment 10. For example, when the request for the transmission of the control program corresponding to the model A is issued from the reproducing equipment 10, the server 20 transmits the control program A corresponding to the model A to the reproducing equipment 10 by referring to the program DB. Also, when the reproducing equipment 10 executes the control program and then requests the transmission of the basic data and the seat parameter by referring to the setting DB, the server 20 transmits the basic data and the seat parameter corresponding to the requested hall and the requested seat to the reproducing equipment 10 by referring to the setting DB. With the above, the configuration of the server 20 is explained.

[Configuration of the Reproducing Equipment 10]

Returning to FIG. 1, the configuration of the reproducing equipment 10 will be explained hereunder. The reproducing equipment 10 includes a controlling portion 110, an operation signal acquiring portion 120, a reproducing portion 130, a connecting portion 140, a storing portion 150, and a communicating portion 160.

The controlling portion 110 has a CPU (Central Processing Unit), a ROM (Read Only Memory), a RAM (Random Access Memory), and the like. The CPU controls respective portions of the reproducing equipment 10 by reading the basic program from the ROM or RAM, the storing portion 150 and executing it. Also, the reproducing equipment 10 executes the control program acquired from the server 20 in the setting process described later, and implements the function in compliance with the contents of the control program.

The operation signal acquiring portion 120 receives the operation signal, which is transmitted by an infrared ray, a radio wave, or the like in response to the operation of the operating button, from a remote controller 121 having operating buttons, or the like, and outputs this signal to the controlling portion 110. When the operation signal is input into the controlling portion 110, the controlling portion 110 recognizes various commands given by the user, and controls respective portions in response to the commands. In this example, the controlling portion 110 recognizes the command issued based on the operation signal from the user. But any command information may be employed instead of the operation signal responding to the operation if the controlling portion 110 can recognize the user's command based on the command information. That is, the operation signal is one mode of the command information.

The reproducing portion 130 has an optical disc holding portion 131, a reading portion 132, and a generating portion 133. The reproducing portion 130 reads the information such as the movie (e.g., video and sound of the movie) recorded on an optical disc under control of the controlling portion 110, and outputs video data indicating the video corresponding to content information and audio data indicating the sound.

The optical disc holding portion 131 holds an optical disc such as CD (Compact Disc), DVD (Digital Versatile Disc), BD (Blu-ray Disc (registered trademark)), or the like, and turns the held optical disc under control of the controlling portion 110. The reading portion 132 reads the video part and the sound part of the content information recorded on the optical disc being held on the optical disc holding portion 131, and outputs them to the generating portion 133.

The generating portion 133 is constructed by the DSP (Digital Signal Processor), for example, and generates the video data and the audio data based on the information being output from the reading portion 132, and outputs the video data and the audio data.

Also, the generating portion 133 generates the video data indicating the setting screen described later under control of the controlling portion 110, and outputs the video data. At this time, the generating portion 133 may stop the generation of the video data based upon the information recorded on the optical disc, or may generate the video data in which the videos corresponding to both video data are synthesized by means of PIP (Picture In Picture).

Also, this procedure applied to the video data is similarly applied to the audio data. The generating portion 133 generates the audio data indicating the sound responding to the setting screen, or the like under control of the controlling portion 110, and outputs the audio data. At this time, the generating portion 133 may stop the generation of the audio data based upon the information recorded on the optical disc, or may generate the audio data in which the sounds corresponding to both audio data are mixed. Also, the generating portion 133 may perform the acoustic process to the audio data based on the information recorded on the optical disc under control of the controlling portion 110.

It depends on the control of the controlling portion 110 in which mode out of above-mentioned modes, the video data and the audio data should be generated respectively. In this case, the video data such as the setting screen, and the audio data corresponding to this video data may be generated in the controlling portion 110, and then the synthesizing process may be executed in an inputting/outputting portion 142 described later.

The connecting portion 140 has an interface portion (IF) 141 and the inputting/outputting portion 142. The interface portion 141 is a connection terminal that is connected to the acoustic process equipment 30 to input/output the data. As described above, the data can be input/output into/from the display device 50 that is not directly connected to this interface portion 141. In the following, these equipments into/from which the data can be input/output are mentioned as the external equipments if they are not particularly discriminated respectively.

The inputting/outputting portion 142 outputs the video data and the audio data, which are output from the generating portion 133, and the control signal, which is output from the controlling portion 110, to the external equipments via the interface portion 141. Accordingly, when the display device 50 acquires the video data, the image indicated by the video data is displayed on the display screen 500. As described above, the setting screen given under control of the controlling portion 110 is contained in this video.

Meanwhile, the inputting/outputting portion 142 outputs the information being input from the external equipment via the interface portion 141, e.g., identification information being output in response to the request to identify the model of the acoustic process equipment 30, to the controlling portion 110.

The storing portion 150 is large capacity storing means such as the hard disc, the nonvolatile memory, or the like, and the reading and the rewriting of the stored contents are executed under control of the controlling portion 110. In this example, various control programs, the data, and the basic program received from the server 20 are stored.

The communicating portion 160 is communicating means such as NIC (Network Interface Card). The communicating portion 160 is connected to the server 20 via the network 1000, and requests the transmission of the control program, the basic data, and the seat parameter from the server 20 under control of the controlling portion 110. Here, in requesting the control program, as described above, the communicating portion 160 requests the control program corresponding to the model that the previously acquired identification information indicates, i.e., the model of the acoustic process equipment 30. With the above, the configuration of the reproducing equipment 10 is explained.

[Operation of the Reproducing Equipment 10]

Next, the setting process executed when the controlling portion 110 of the reproducing equipment 10 executes the basic program stored in the ROM, the RAM, or the storing portion 150 will be explained with reference to FIG. 3 to FIG. 8B hereunder. The "setting process" denotes the process that is applied to set the acoustic process in the external equipment, i.e., the acoustic process equipment 30 in this example, when the reproducing equipment 10 acquires the control program for this process from the server 20 and executes this program.

[Setting Process]

Figure 3:
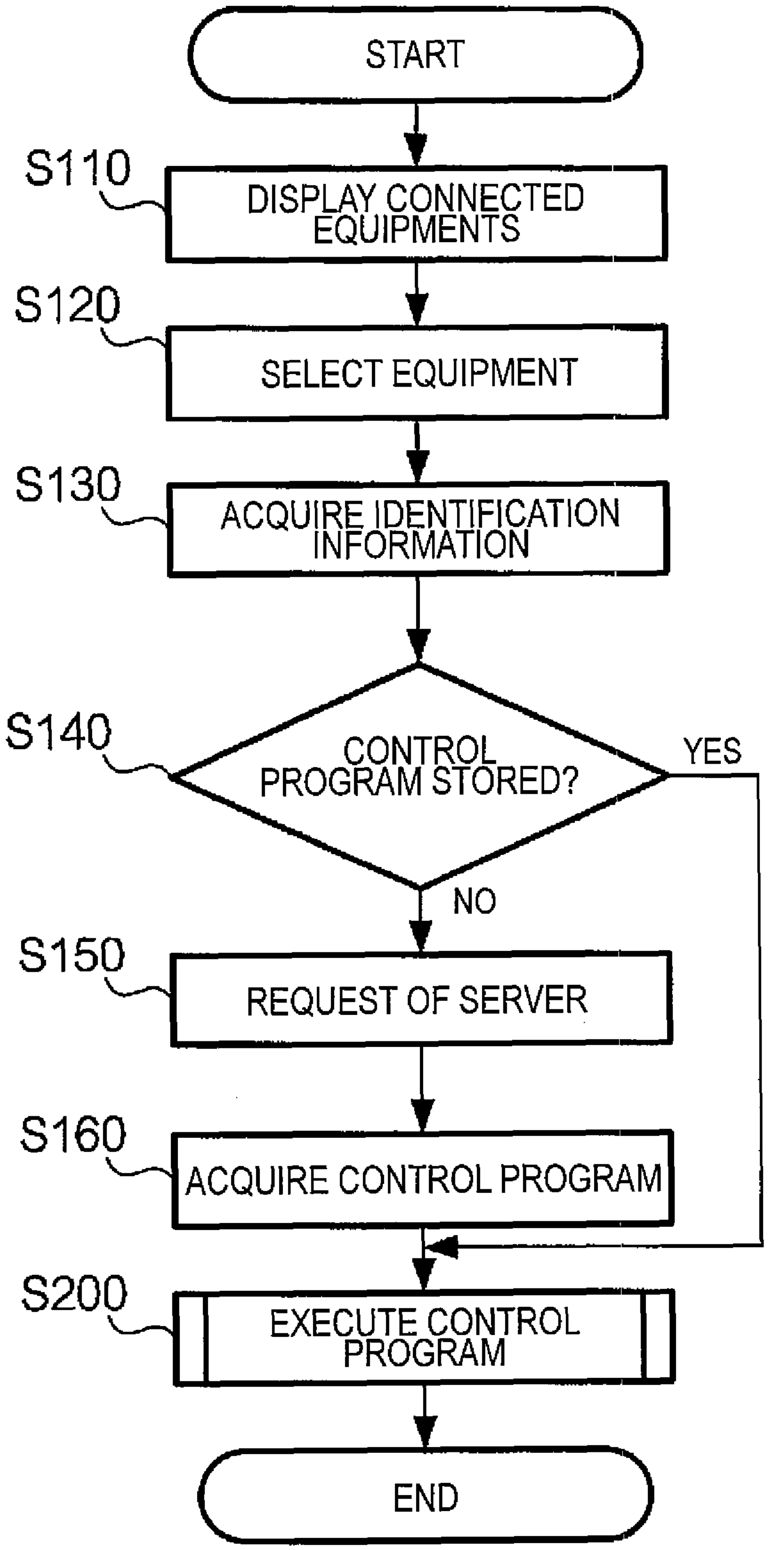
FIG. 3 is a flowchart showing a flow of a setting process.

FIG. 3 is a flowchart showing a flow of the setting process. Respective steps will be explained sequentially along with the flowchart. First, when the command to start the setting process is issued by the user's operation of the remote controller 121, or the like, the controlling portion 110 starts the setting process. At first, the controlling portion 110 causes the display device 50 to display the external equipments connected to the interface portion 141 on the display screen 500 (step S110). Here, the display contents indicating that the acoustic process equipment 30 and the display device 50 are connected to the reproducing equipment 10 are displayed on the display screen 500. In this case, in order to know what types of external equipments are connected to the reproducing equipment 10, the user may recognize the connected external equipments by receiving the identification information of the external equipments when the setting process is started.

The user may store in advance the identification information, which are received when the external equipments are connected directly or indirectly to the reproducing equipment 10 via the interface portion 141, in the storing portion 150 or the RAM of the controlling portion 110. Alternately, instead of the reception of the identification information, the user may display a list of a plurality of candidate models such that the user can select the model of the connected external equipment from the list.

The user selects the external equipment that is to be set, by operating the remote controller 121 while checking the display contents on the display screen 500 (step S120). In this example, the user selects the acoustic process equipment 30. When the acoustic process equipment 30 is selected, the controlling portion 110 acquires the identification information of the selected acoustic process equipment 30 out of the previously received identification information (step S130). The controlling portion 110 decides whether or not the control program corresponding to the model that is indicated by the identification information is stored in the storing portion 150 (step S140).

If this control program is stored in the storing portion 150 (step S140; Yes), the controlling portion 110 reads this control program from the storing portion 150 and executes this control program (step S200).

In contrast, if this control program is not stored in the storing portion 150 (step S140; No), the controlling portion 110 requests the transmission of the control program corresponding to the model that is indicated by the identification information to the server 20 (step S150). Then, the controlling portion 110 receives/acquires the control program that is transmitted from the server 20 as a response to the request (step S160). Then, the controlling portion 110 stores the control program in the storing portion 150, and executes this control program (step S200).

Next, the control program executing process (step S200) will be explained hereunder.

[Control Program Executing Process]

Figure 4:
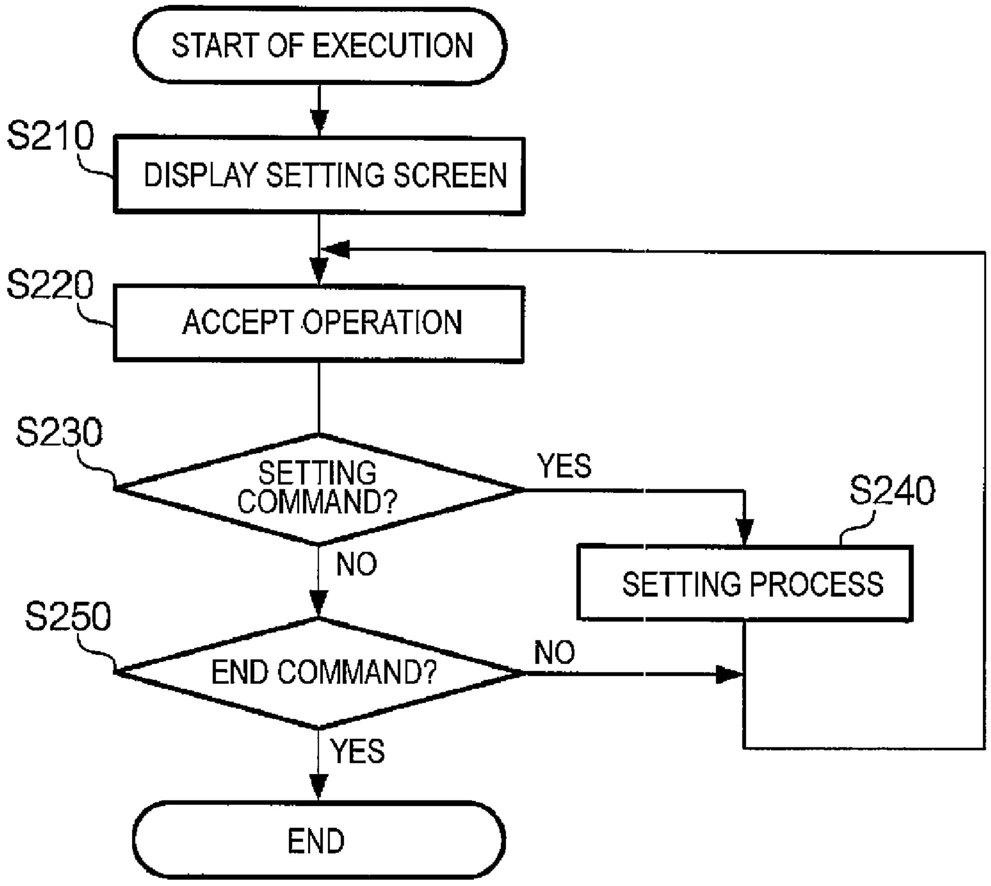
FIG. 4 is a flowchart showing a flow of a control program executing process.

FIG. 4 is a flowchart showing a flow of the control program executing process. First, the controlling portion 110 starts the control program, and then causes the display device 50 to display the setting screen on the display screen 500 in compliance with the contents of the control program (step S210). The display screen 500 accepts the operation signal that is output when the user operates the remote controller 121 while checking the setting screen on the display screen 500 (step S220).

If the setting command is issued by the operation of the user (step S230; Yes), the controlling portion 110 outputs the control signal to execute the setting process of the acoustic process in response to the operation of the acoustic process equipment 30 (step S240). In contrast, if neither the setting command is issued by the operation (step S230; No) nor the end command is issued (step S250: No), for example, if merely the cursor in the setting screen is moved, the controlling portion 110 continues to accept the operation (step S220). Also, if the setting command is not issued by the operation (step S230; No) but the end command is issued (step S250: Yes), the control program executing process is ended.

[Display Example of the Setting Screen]

The flow of the control program executing process is explained as above. Next, the display contents of the concrete setting screen and its setting process will be explained by taking a specific example hereunder. First, the setting screen used when the relations between the arranged positions of the speakers and the listening position are measured and the relations are set (referred to as a "speaker setting" hereinafter) in the situation that the sound emitting device 40 has the speakers (C, L, R, SL, SR, SW) corresponding to a plurality of channels (e.g., 5.1 ch) will be explained hereunder.

Figure 5A:
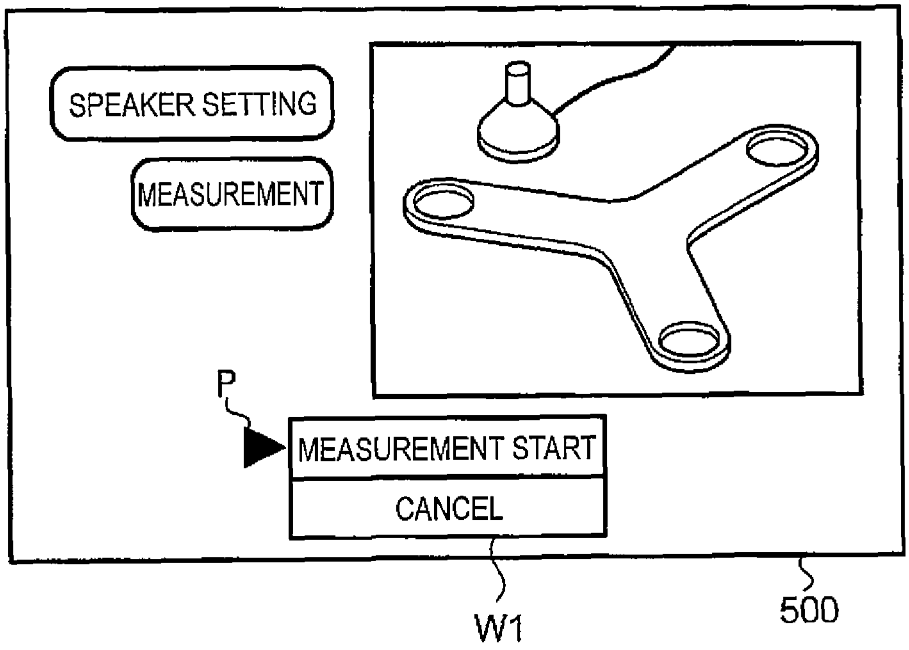
FIGS. 5A and 5B are views showing examples (measurement) of a speaker setting screen.
Figure 5B:
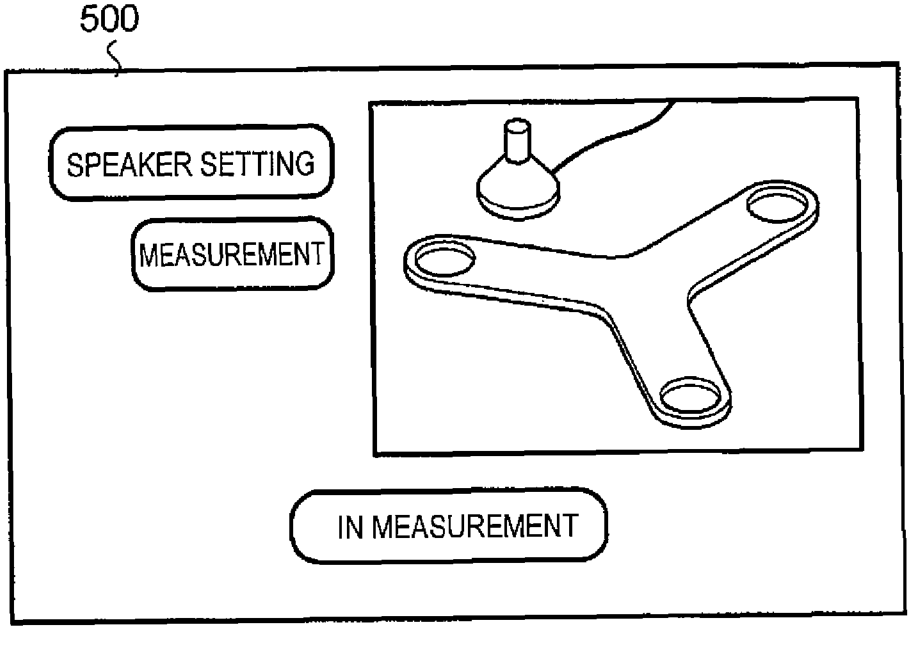

FIGS. 5A and 5B are views showing examples (measurement) of a speaker setting screen. First, the operation of the remote controller 121 is carried out to instruct the start of the speaker setting, and then a setting screen shown in FIG. 5A is displayed on the display screen 500. A display for calling upon the user to choose either "measurement start" or "cancel" is given on a select window W1, and then the user can choose any one of them by operating the remote controller 121 to move a pointer P vertically.

When the user chooses "measurement start", the display on the display screen 500 is changed into the contents shown in FIG. 5B. Then, the speaker setting process is started in the acoustic process equipment 30 under control of the controlling portion 110. In contrast, when the user chooses "cancel", the speaker setting process is ended.

Here, the "speaker setting process" denotes such an operation that the acoustic process equipment 30 collects the sounds by the microphones arranged in the listening position while outputting the sounds from the speakers arranged in respective positions, then measures the relations between the listening position and the arrangement positions of respective speaker, and then sets their positional relations as one parameter used in performing the acoustic process. The publicly known technologies may be employed in the detail processes, and therefore their explanation will be omitted herein.

Figure 6A:
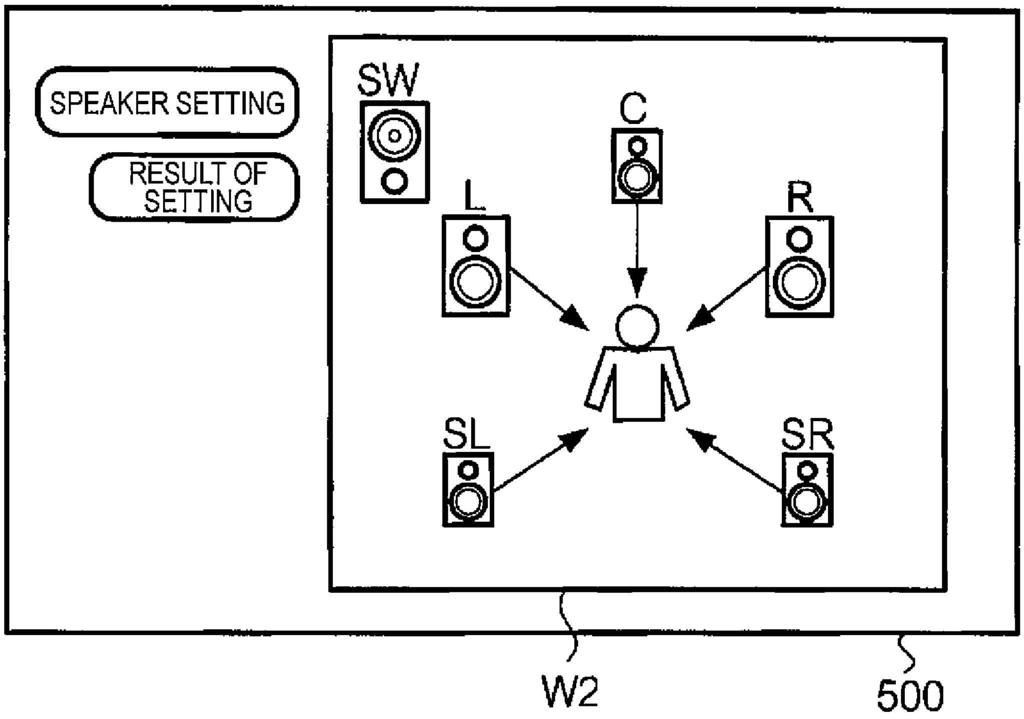
FIGS. 6A and 6B are views showing examples (set results) of the speaker setting screen.
Figure 6B:
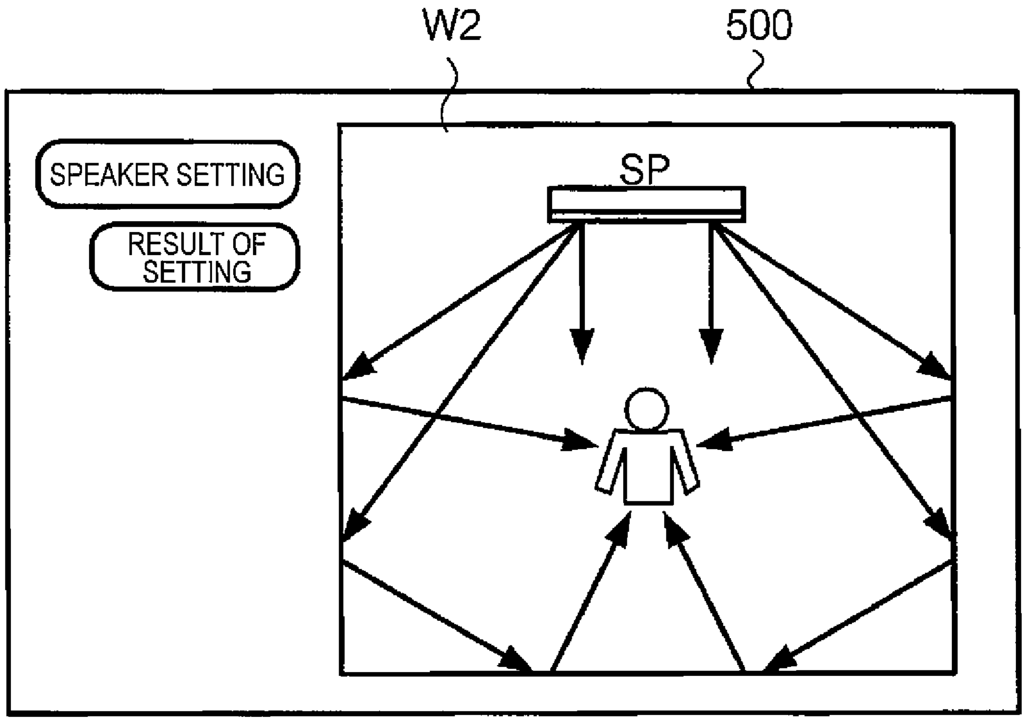

FIGS. 6A and 6B are views showing examples (set results) of the speaker setting screen. FIG. 6A is a view showing an example of the contents that are displayed on the display screen 500 as the results of the above speaker setting. In this example, the set positional relations are schematically displayed on a window W2 in the display screen 500. FIG. 6B is a view showing an example of the contents that are displayed on the display screen 500 as the results of the above speaker setting when the sound emitting device 40 has a speaker (SP) that outputs the sounds directed in plural directions such that the sounds arrive at the listener in terms of the wall surface reflection. In both displays, the traveling paths of the sounds are indicated by an arrow, or the like respectively, but they are not limited to this indication. The traveling paths of the sounds may be indicated by a wave front, or may be expressed by using an animation.

Figure 7A:
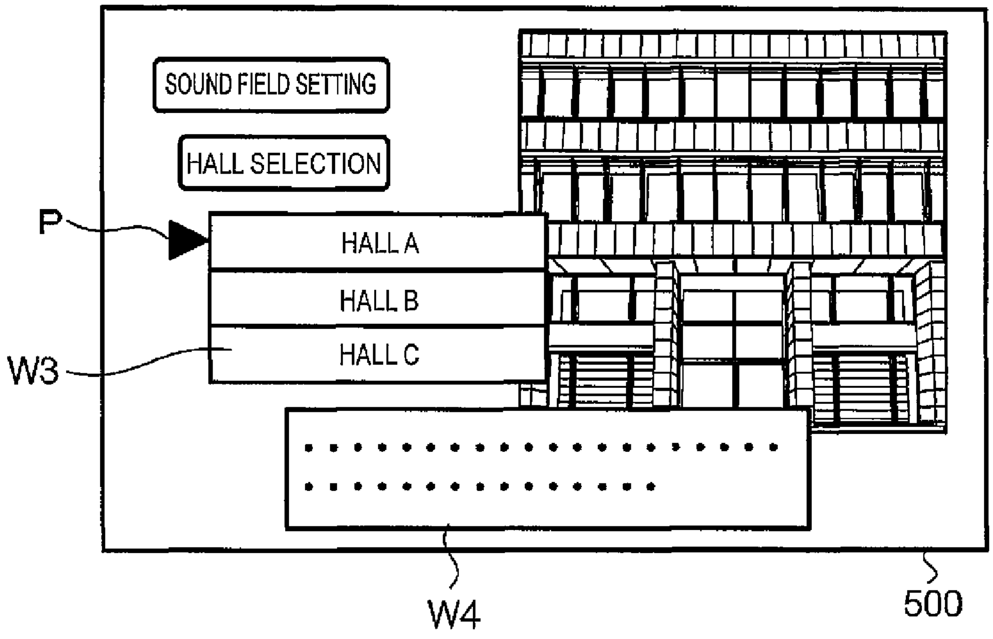
FIGS. 7A and 7B are views showing examples (hall selection) of a sound field setting screen.
Figure 7B:
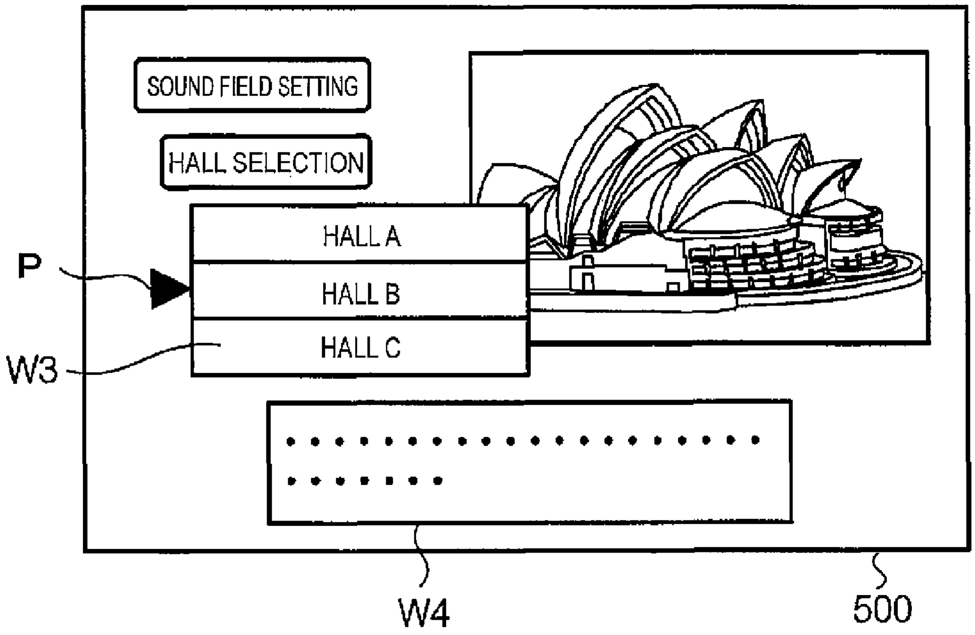

FIGS. 7A and 7B are views showing examples (hall selection) of a sound field setting screen. The "sound field setting" denotes the setting in the acoustic process equipment 30, which is carried out to perform the process of applying the sound field effect to the sounds corresponding to the audio data being input from the reproducing equipment 10. In this example, the "sound field setting" corresponds to the setting that is carried out to reproduce the sound field in the particular seat in the selected hall. As shown in FIG. 7A, a select window W3 used to select the hall in which the sound field is to be reproduced is displayed on the display screen 500. The image of the hall selected by the pointer P is displayed at the background of the display in the display screen 500, and the caption of the hall is displayed in a caption window W4. The user moves the pointer P by operating the remote controller 121, e.g., moves the pointer P from the hall A to the hall B, and thus the display contents of the display screen 500 is changed from the display shown in FIG. 7A to the display shown in FIG. 7B.

In this case, in the explanation of the hall in the caption window W4, not only the sentence explanation but also the graph showing the frequency characteristic, or the drawing may be employed.

These displays are given when the reproducing equipment 10 requests the data corresponding to the hall being selected by the pointer P from the server 20, and then acquires the basic data corresponding to the hall from the server 20. At this time, the reproducing equipment 10 may acquire the seat parameters that correspond to the seats decided in advance as the representative seats out of all seats in the selected hall, and may set these seat parameters in the acoustic process equipment 30. In this case, this operation may be treated as the operation that should be carried out to select the hall and issue the setting command (in FIG. 4, step S230; Yes). By doing this, the user can select the hall based on the sound emitted from the sound emitting device 40, while listening what type of the sound field effect is applied. In a situation that the setting command is not issued at any time by the user's selection, the user may cause the acoustic process equipment 30 to set the acoustic process (in FIG. 4, step S240) when the setting command is issued separately from the selection (in FIG. 4, step S230; Yes).

Then, the user decides the hall, in which the sound field is reproduced, by the operation of the remote controller 121, and then sets which seat in the hall should be selected.

Figure 8A:
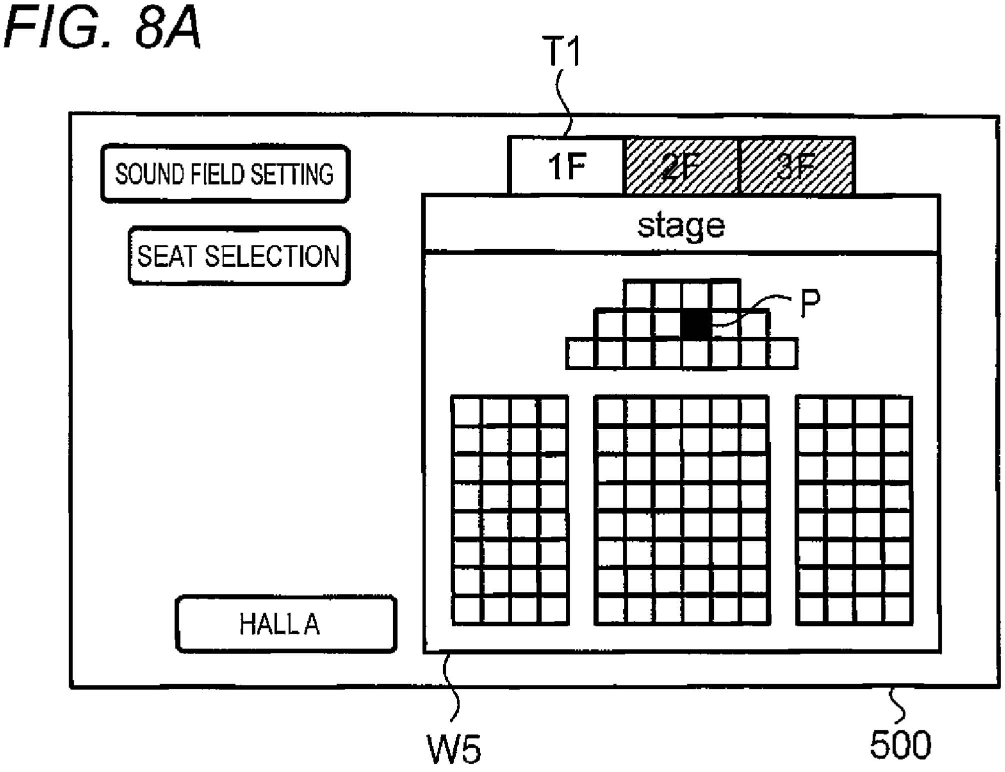
FIGS. 8A and 8B are views showing examples (seat selection) of the sound field setting screen.
Figure 8B:
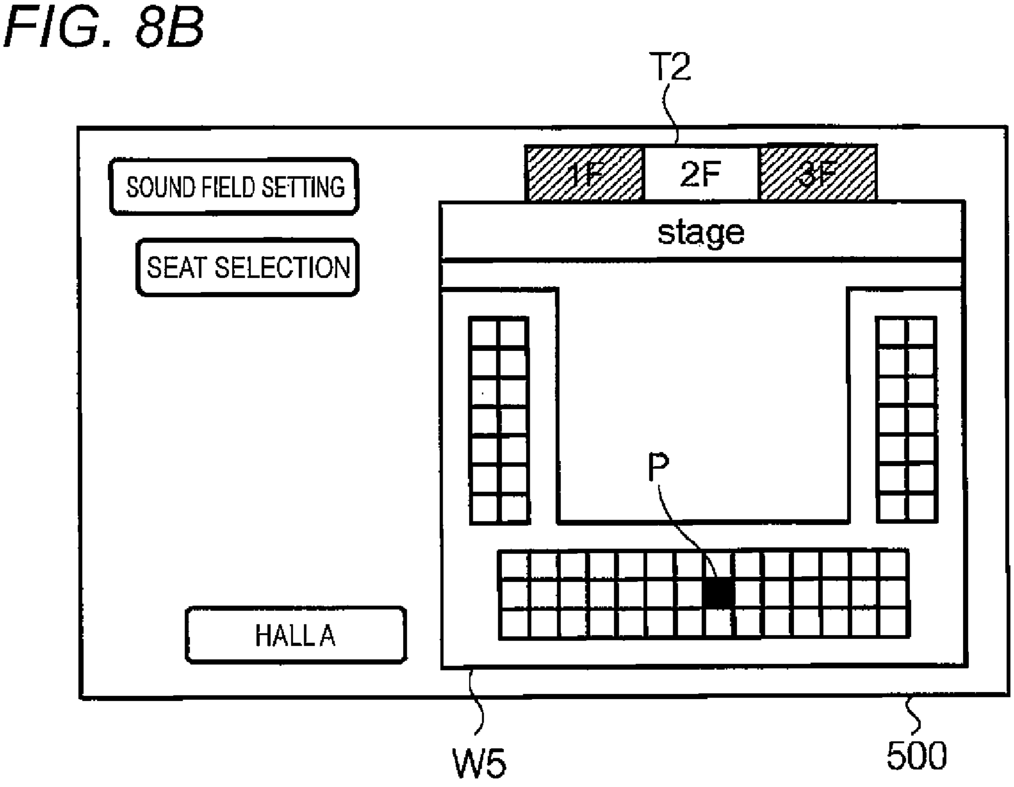

FIGS. 8A and 8B are views showing examples (seat selection) of the sound field setting screen. The user decides the hall (decides a hall A, in this example) while looking at the display on the display screen 500 shown in FIGS. 7A and 7B. At that time, a seat selecting window W5 is displayed on the display screen 500, as shown in FIG. 8A, such that the user can select the seat by moving the pointer P based on the operation of the remote controller 121. Also, respective tabs indicating the floors (1F, 2F, 3F), on which the seats are provided, are provided at the top of the seat selecting window W5. When the user selects "1F tab T1", the seats on 1F are displayed on the seat selecting window W5. When the user selects "2F tab T2", the seats on 2F, as shown in FIG. 8B, are displayed on the seat selecting window W5.

In selecting the seat, the reproducing equipment 10 may request the seat parameter of the seat selected by the pointer P in the hall A being selected from the server 20, then acquire the seat parameter from the server 20, and then set the parameters in the acoustic process equipment 30. This respect is similar to the case of the above hall selection.

In the above explanation, when the user causes the acoustic process equipment 30 to perform the acoustic process, which applies the sound field effect corresponding to the selected contents, while selecting the hall and the seat, such user may acquire the basic data, the seat parameter, etc. necessary for the setting at any time in response to the user's selection. In this case, the user may acquire collectively the associated matters when such user acquires the control program. Also, the seat parameter may be stored previously in the acoustic process equipment 30. In such case, the reproducing equipment 10 may instruct the acoustic process equipment 30 to set the acoustic process by using the stored seat parameter.

Then, the setting end command is issued by the operation of the remote controller 121, and then the setting process is ended. In the example of the acoustic effect settings (the speaker setting, the sound field setting, and the like), for example, the user may select which setting should be carried out, by the operation of the remote controller 121 in a state that the display for urging the user to choose any one of these settings may be provided as a part of the setting screen.

In this manner, in the AV system 1 according to the embodiment of the present invention, the reproducing equipment 10 acquires the control program corresponding to the model of the acoustic process equipment 30 from the server 20 and executes this control program. Thus, the reproducing equipment 10 causes the display device 50 to display the setting screen, which indicates the setting of the acoustic process executed in the acoustic process equipment 30, on the display screen 500. Therefore, the reproducing equipment 10 executes the setting of the acoustic process in the acoustic process equipment 30 based on the command that the user issues while checking this display.

As a result, even though both the data indicating the setting screen corresponding to the setting of the acoustic process and the display function used for this display are not particularly provided to the acoustic process equipment 30 at great cost, not only the display of the high quality easy-use setting screen but also the setting of the acoustic process equipment 30 can be provided by the reproducing equipment 10 that is equipped with the generating portion 133 to generate the video data displayed on the display screen 500. Also, even when the model of the acoustic process equipment 30 to be connected is changed, the reproducing equipment 10 can execute the setting process in response to various models since this equipment 10 can acquire the control program corresponding to the model from the server 20.

<Variations>

With the above, the embodiment of the present invention is explained, but the present invention can be carried out in various modes as follows.

[Variation 1]

In the above embodiment, the reproducing equipment 10 provides the setting of the acoustic process in the acoustic process equipment 30 by executing the control program that is acquired from the server 20. In this case, the reproducing equipment 10 may update the operation program used in the acoustic process equipment 30, and others. Any program may be employed as the "operation program" if such program can be executed in the acoustic process equipment 30. For example, a basic program used to execute the basic operation of the acoustic process equipment 30, a difference program used to add the contents of the acoustic process, and the like may be listed.

FIG. 9 is a view explaining a database stored in the server 20 according to Variation 1. In this example, the operation programs are registered in the program DB to correspond to the model of the acoustic process equipment 30 respectively, and also the versions of the operation programs are correlated with the models respectively. For example, the operation programs A, B, C are registered in the program DB to correspond to the models A, B, C respectively, and respective versions are "1.2", "1.13", and "2.1".

Next, an updating process of the operation program in the acoustic process equipment 30 will be explained with reference to FIG. 10 hereunder.

Figure 10:
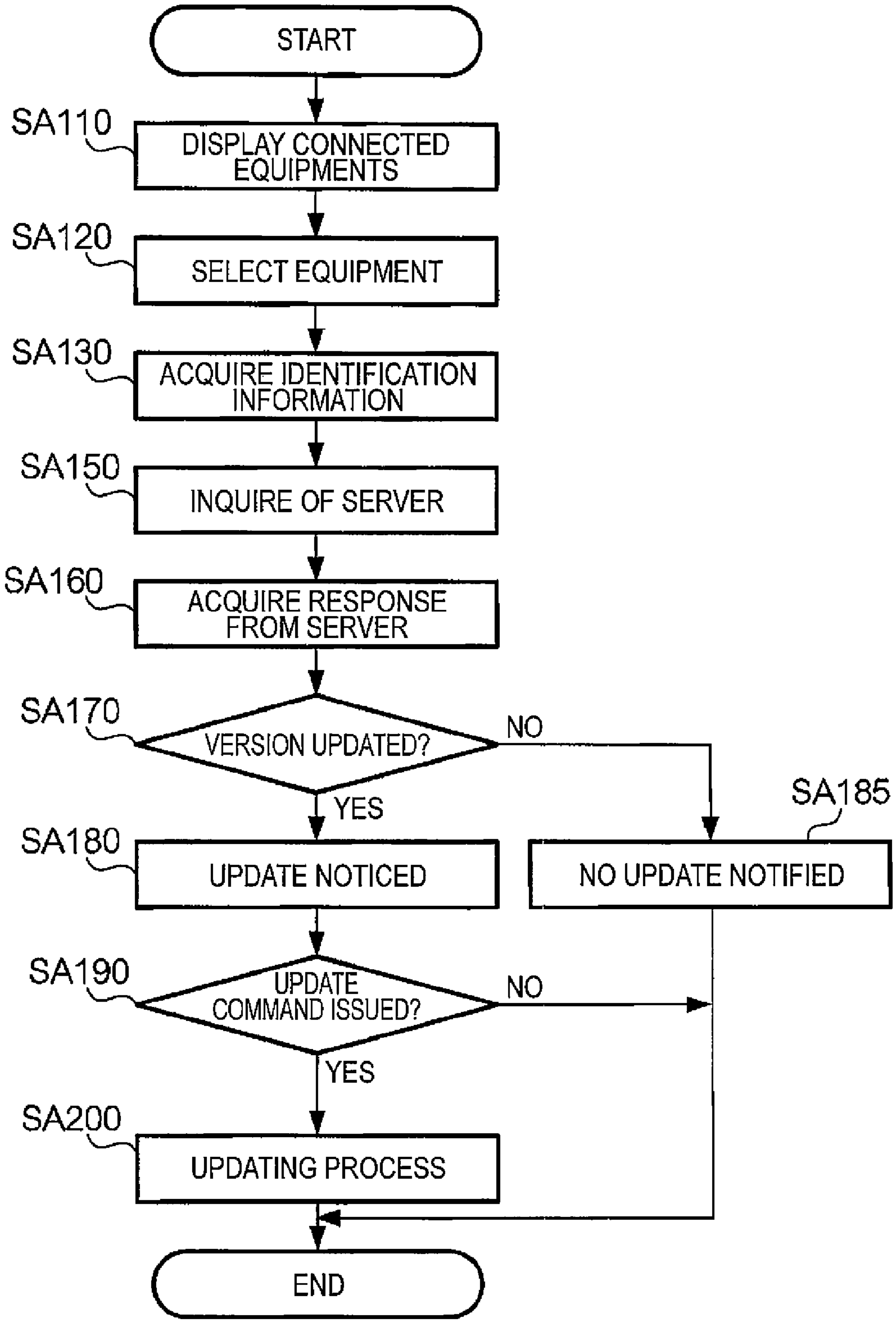
FIG. 10 is a flowchart showing a flow of an updating process according to Variation 1.

FIG. 10 is a flowchart showing a flow of an updating process according to Variation 1. Here, processes in steps SA110, SA120, and SA130 are similar to those in steps S110, S120, and S130 in above FIG. 3, and their explanation will be omitted herein. Respective processes subsequent to the process in SA150 will be explained hereunder.

Here, unlike the identification information in the embodiment, the identification information that the controlling portion 110 acquires indicates not only the model but also the version of the used operation program.

The reproducing equipment 10 notifies the server 20 of the model indicated by the identification information and the version of the operation program, and inquires of the server 20 whether or not the operation program used in the connected acoustic process equipment 30 corresponds to the newest version (SA150). Then, the server 20 refers to the program DB in response to this notification to decide whether or not the version corresponding to the notified model is identical to the notified version. Then, if these versions are identical to each other, the server 20 returns the response indicating that the operation program used in the acoustic process equipment 30 is the newest version and no update is needed, to the reproducing equipment 10. In contrast, if these versions are different from each other, the server 20 returns the response indicating that the operation program is not the newest version and the update is needed, to the reproducing equipment 10. As a result, the reproducing equipment 10 acquires the response from the server 20 (SA160).

If the response from the server 20 indicates that the update of the version is not needed (step SA170; No), the controlling portion 110 sends out the notification indicating that no update is necessary is displayed on the display screen 500 (step SA185). Then, the updating process is ended. In contrast, if the response indicates that the update of the version is needed (step SA170; No), the controlling portion 110 sends out the notification indicating that update is necessary is displayed on the display screen 500 (step SA180).

Then, it is decided whether or not the update command is issued by the operation of the remote controller 121 of the user who checks this display (step SA190). Then, if no update command is issued (the command not to need the update is issued) (step SA190; No), the updating process is ended. In contrast, if the update command is issued (the command to need the update is issued) (step SA190; Yes), the update of the operation program is executed (SA200). Then, the updating process is ended.

The "update of the operation program" corresponds to such procedures that the reproducing equipment 10 requests the operation program corresponding to the model indicated by the identification information from the server 20, then acquires the concerned operation program from the server 20 in response to the request, and then updates the operation program of the acoustic process equipment 30 to the acquired operation program. In this way, the operation program can be updated.

Like the embodiment, in order to update the operation program in the acoustic process equipment 30, when the control programs to be executed in the controlling portion 110 of the reproducing equipment 10 are registered in the server 20 every model of the acoustic process equipment 30, the reproducing equipment 10 may acquire the control program from the server 20 and then update the operation program in the acoustic process equipment 30 by executing the control program.

[Variation 2]

In the above embodiment, the manual corresponding to the setting screen may be displayed while various setting screens are displayed on the display screen 500. In this case, the contents used to implement the function of displaying the manual may be contained in the control program, or another control program used to display the manual may be acquired from the server and executed in parallel with the control program. Here, after the manual may be displayed, the setting screen used to perform the setting corresponding to the portion where the manual is displayed may be displayed in response to the user's command.

In the above embodiment, even if the control program is stored in the storing portion 150 (step S140; Yes in FIG. 3), the server 20 may be allowed to check whether not the new control program is contained in the storing portion 150. Then, when a new version of the control program is contained there, the reproducing equipment 10 may acquire and execute this control program. It may be decided whether or not the version is new, by comparing the versions of the control programs.

[Variation 3]

In the above embodiment, when the content information indicating the contents are recorded as the information that are recorded on the optical disc being held in the optical disc holding portion 131, the reading portion 132 reads the content information and outputs the information to the controlling portion 110. The controlling portion 110 may change the contents of the setting screen displayed on the display screen 500 in response to the content information, by executing the control program. For example, when the contents indicated by the content information indicates the concert that is held in a hall B, the hall B may be selected automatically in the above sound field setting, or the display that recommends the selecting of the hall B may be given.

In this process, the controlling portion 110 may generate the command information indicating the command to select the hall B in response to the content information. That is, in place of the user's operation of the remote controller 121, the command may be issued automatically in response to the content information.

Also, when the reproducing equipment 10 notifies the server 20 of the content information, the server 20 recognizes the recommended set contents in the acoustic process from the content information by referring to the database, and then returns the response. Then, the reproducing equipment 10 may decide the contents of the setting screen in response to the recommended set contents.

In this case, even when such content information are not recorded in the optical disc, the controlling portion 110 may either generate the content information by analyzing the portions corresponding to the video and the sound out of the recorded content information or cause the server 20 to analyze the portions corresponding to the video and the sound.

[Variation 4]

In the above embodiment, the setting of the acoustic process in the acoustic process equipment 30 is explained by way of example. In this case, when the display device 50 has the function of performing the acoustic process, the reproducing equipment 10 may change the setting in the display device 50 by acquiring and executing the control program corresponding to the model of the display device 50.

[Variation 5]

In the above embodiment, the reproducing equipment 10 causes the display device 50 to display the setting screen on the display screen 500, by executing the control program. In this case, when the reproducing equipment 10 has the display screen corresponding to the display screen 500, the reproducing equipment 10 may display the setting screen on such display screen. For this purpose, the reproducing equipment 10 and the display device 50 may be constructed integrally as a single equipment.

[Variation 6]

The basic program in the above embodiment can be provided in a state that this program is stored in the computer-readable recording medium such as magnetic recording medium (magnetic tape, magnetic disc, or the like), optical recording medium (optical disc, or the like), magnet-optical recording medium, semiconductor memory, or the like. In this case, an interface for reading the recording medium may be provided. Also, the basic program may be downloaded into the recording medium via the network.

According to an aspect of the invention, in the acoustic equipment such as an AV amplifier, various settings of the acoustic equipment can be executed easily while suppressing a cost increase.

What is claimed is:

1. An external equipment controlling apparatus, comprising:

a connecting unit, connected to at least one of a plurality of external equipment via an interface to input/receive data into/from at least one of the plurality of the external equipment, the at least one of the plurality of external equipment to which audio data is input and which performs an acoustic process to a sound corresponding to the audio data and causes a speaker to emit the sound;

an audio data outputting unit, operable to generate the audio data, and operable to output the audio data to the at least one of the plurality of external equipment;

an identification information acquiring unit, configured to acquire identification information for specifying one of the plurality of external equipment from the plurality of external equipment;

a program acquiring unit, configured to acquire, from a server which stores a plurality control programs corresponding to the plurality of external equipment respectively via a network, one of the plurality of control programs which corresponds to the one of the plurality of external equipment specified by the identification information;

a video data outputting unit, operable to generate video data for displaying a setting screen for setting the acoustic process on a displaying unit, and operable to output the video data to the displaying unit; and a controlling unit, by executing the one of the plurality of control programs, configured to control a content of the video data and to control the one of the plurality of external equipment by setting the acoustic process in response to command information to be input.

2. The external equipment controlling apparatus according to claim 1, wherein the server stores a parameter which is used to perform the acoustic process and which corresponds to a content of the acoustic process, and the controlling unit acquires the parameter to set the acoustic process from the server and sets the parameter in the one of the plurality of external equipment.

3. The external equipment controlling apparatus according to claim 1, further comprising:

a reading unit, operable to read information recorded on a recording medium, wherein the audio data outputting unit generates the audio data based on the information read by the reading unit, the video data outputting unit generates the video data based on the information read by the reading unit, and the controlling unit changes a content of the setting screen, which is displayed on the displaying unit, in response to the information read by the reading unit.

4. The external equipment controlling apparatus according to claim 1, wherein the connecting unit is connected to the plurality of external equipment.

5. A method of setting an acoustic process of at least one of a plurality of external equipment to which audio data is input and which performs an acoustic process to a sound corresponding to the audio data and causes a speaker to emit the sound, the method comprising:

acquiring identification information for specifying one of the plurality of external equipment from the plurality of external equipment;

acquiring, from a server which stores a plurality of control programs corresponding to the plurality of external equipment respectively via a network, one of the plurality of control programs which corresponds to the one of the plurality of external equipment specified by the identification information;

generating video data for displaying a setting screen for setting the acoustic process on a displaying unit and outputting the video data to the displaying unit; and by executing the one of the plurality of control programs, controlling a content of the video data and controlling the one of the plurality of external equipment by setting the acoustic process in response to command information to be input.

6. An external equipment controlling apparatus, comprising:

a processor; and a memory having a computer readable instructions stored thereon that, when executed by the processor, causes the external equipment controlling apparatus to function as:

a connecting unit, connected to at least one of a plurality of external equipment via an interface to input/receive data into/from the at least one of the plurality of external equipment, the at least one of the plurality of external equipment to which audio data is input and which performs an acoustic process to a sound corresponding to the audio data and causes a speaker to emit the sound;

an audio data outputting unit, operable to generate the audio data, and operable to output the audio data to the at least one of the plurality of external equipment;

an identification information acquiring unit, configured to acquire identification information for specifying one of the plurality of external equipment from the external equipment;

a program acquiring unit, configured to acquire, from a server which stores a plurality of control programs corresponding to the plurality of external equipment respectively via a network, one of the plurality of control programs which corresponds to the one of the plurality of external equipment specified by the identification information from a server via a network;

a video data outputting unit, operable to generate video data for displaying a setting screen for setting the acoustic process on a displaying unit, and operable to output the video data to the displaying unit; and a controlling unit, by executing the one of the plurality of control programs, configured to control a content of the video data and to control the one of the plurality of external equipment by setting the acoustic process in response to command information to be input.

7. The external equipment controlling apparatus according to claim 6, wherein the server stores a parameter which is used to perform the acoustic process and which corresponds to a content of the acoustic process, and the controlling unit acquires the parameter to set the acoustic process from the server and sets the parameter in the one of the plurality of external equipment.

8. The external equipment controlling apparatus according to claim 6, wherein the memory further causes the external equipment controlling apparatus to function as a reading unit, operable to read information recorded on a recording medium, the audio data outputting unit generates the audio data based on the information read by the reading unit, the video data outputting unit generates the video data based on the information read by the reading unit, and the controlling unit changes a content of the setting screen, which is displayed on the displaying unit, in response to the information read by the reading unit.

9. An external equipment controlling apparatus, comprising:

a connecting unit, connected to an external equipment via an interface to input/receive data into/from the external equipment, the external equipment to which audio data is input and which performs an acoustic process to a sound corresponding to the audio data and causes a speaker to emit the sound;

an audio data outputting unit, operable to generate the audio data, and operable to output the audio data to the external equipment;

an identification information acquiring unit, configured to acquire identification information for specifying the external equipment from the external equipment;

a program acquiring unit, configured to acquire a control program corresponding to the external equipment specified by the identification information from a server via a network;

a video data outputting unit, operable to generate video data for displaying a setting screen for setting the acoustic process on a displaying unit, and operable to output the video data to the displaying unit;

a controlling unit, by executing the control program, configured to control a content of the video data and to control the external equipment by setting the acoustic process in response to command information to be input; and a reading unit, operable to read information recorded on a recording medium, wherein the audio data outputting unit generates the audio data based on the information read by the reading unit, the video data outputting unit generates the video data based on the information read by the reading unit, and the controlling unit changes a content of the setting screen, which is displayed on the displaying unit, in response to the information read by the reading unit.

* * * * *